(12) United States Patent
Bassani et al.

(10) Patent No.: US 11,837,219 B2
(45) Date of Patent: Dec. 5, 2023

(54) CREATION OF A MINUTE FROM A RECORD OF A TELECONFERENCE

(71) Applicant: International Business Machines Corporation, Armonk, NY (US)

(72) Inventors: Damiano Bassani, Rome (IT); Alfonso D'Aniello, Gragnano (IT); Andrea Tortosa, Rome (IT); Roberto Giordani, Rome (IT); Michela Melfa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 17/455,521

(22) Filed: Nov. 18, 2021

(65) Prior Publication Data

US 2023/0154456 A1 May 18, 2023

(51) Int. Cl.
  *G10L 15/08* (2006.01)
  *G10L 25/51* (2013.01)

(52) U.S. Cl.
  CPC .............. *G10L 15/08* (2013.01); *G10L 25/51* (2013.01)

(58) Field of Classification Search
  CPC ................................ G10L 15/08; G10L 25/51
  See application file for complete search history.

(56) References Cited

U.S. PATENT DOCUMENTS

| | | | |
|---|---|---|---|
| 7,707,227 B2 | 4/2010 | Shibata | |
| 10,084,829 B2 | 9/2018 | Sanso | |
| 10,282,431 B1 * | 5/2019 | Bhotika | G06F 16/5838 |
| 10,824,814 B2 * | 11/2020 | Faizakof | G10L 15/1815 |
| 11,734,374 B2 * | 8/2023 | Zhao | G06F 16/90332 |
| | | | 709/203 |
| 2005/0060643 A1 * | 3/2005 | Glass | H04L 51/212 |
| | | | 715/205 |
| 2007/0112926 A1 | 5/2007 | Brett | |
| 2013/0091021 A1 * | 4/2013 | Maslov | G06Q 30/0251 |
| | | | 705/14.69 |

(Continued)

FOREIGN PATENT DOCUMENTS

| | | |
|---|---|---|
| CN | 104780282 A | 7/2015 |
| CN | 106446109 A | 2/2017 |
| CN | 107451110 A | 12/2017 |
| CN | 110866110 A | 3/2020 |
| CN | 112765344 A | 5/2021 |

(Continued)

OTHER PUBLICATIONS

"International Search Report and Written Opinion", International Searching Authority, International application No. PCT/IB2022/060987, International filing date: Nov. 15, 2022, 8 pages.

(Continued)

*Primary Examiner* — Fariba Sirjani
(74) *Attorney, Agent, or Firm* — Stephanie L. Carusillo

(57) ABSTRACT

In several aspects for creating a minute of a teleconference from a record thereof, a processor classifies portions of the record as relevant or non-relevant according to corresponding relevance indicators with respect to a topic of the teleconference. A processor removes the non-relevant portions from the record. A processor classifies pairs of relevant portions as similar or non-similar according to corresponding similarity indicators. A processor removes one of the relevant portions of each similar pair of relevant portions from the minute.

17 Claims, 7 Drawing Sheets

(56) References Cited

U.S. PATENT DOCUMENTS

| | | | |
|---|---|---|---|
| 2015/0066501 A1* | 3/2015 | Thapliyal | G06F 16/5846 |
| | | | 704/235 |
| 2015/0142800 A1* | 5/2015 | Thapliyal | G06F 16/285 |
| | | | 707/737 |
| 2015/0199962 A1* | 7/2015 | Han | G10L 15/08 |
| | | | 704/237 |
| 2016/0277518 A1 | 9/2016 | Grant | |
| 2019/0378076 A1* | 12/2019 | O'Gorman | H04M 3/56 |
| 2020/0194003 A1 | 6/2020 | Funato | |
| 2020/0410997 A1* | 12/2020 | Bar-on | G10L 15/22 |
| 2021/0097502 A1* | 4/2021 | Hilleli | G06N 3/08 |
| 2021/0110475 A1* | 4/2021 | Singh | G06F 40/205 |
| 2021/0407499 A1* | 12/2021 | Sun | G06F 40/30 |
| 2022/0365993 A1* | 11/2022 | Voisin | G06F 18/214 |
| 2023/0140981 A1* | 5/2023 | Pouran Ben Veyseh | |
| | | | G06F 16/367 |
| | | | 704/9 |
| 2023/0154456 A1* | 5/2023 | Bassani | G10L 15/08 |
| | | | 704/200 |

FOREIGN PATENT DOCUMENTS

| | | |
|---|---|---|
| CN | 113140216 A | 7/2021 |
| CN | 113641778 A | 11/2021 |
| CN | 113204627 B | 8/2022 |

OTHER PUBLICATIONS

Google, "How Search algorithms work", Google, Accessed on Nov. 5, 2021, 3 Pages.

* cited by examiner

CREATION OF A MINUTE FROM A RECORD OF A TELECONFERENCE

BACKGROUND

The present invention relates generally to the field of information technology, and more specifically to creating a minute from a record of a teleconference.

Teleconferences (also known as online conferences) are very useful to exchange information in real-time over telecommunication networks among several persons that are remote from one another. Particularly, teleconferences generally involve reception and transmission of live speeches and video of the persons participating to them (participants). For example, teleconferences are used to implement virtual meetings, virtual seminars, and so on. As a result, the participants may communicate effectively even when they are in locations being dispersed geographically. This provides a time- and cost-effective alternative to a traditional approach (i.e., face-to-face), which often requires long travels by the persons to meet in a common physical site.

Teleconferences have attained a widespread use recently, thanks to the larger and larger bandwidth that is provided by modern telecommunication networks. Particularly, the ubiquitous availability of the Internet has made it possible for teleconferences to utilize its technology for web conferences. Moreover, web conferences allow exchanging multimedia contents (such as audio, video, images, data, and so on) in a very fast and simple way. The massive use of web conferences has fostered the adoption of remote work, allowing persons to work outside work sites of corresponding organizations. This has become especially important recently, because of the unfolding COVID-19 pandemic that has forced many persons to work from home.

Services implementing teleconferences generally offer a number of additional features. Particularly, most (teleconference) services allow activating a transcription of the speech of each teleconference. The transcription may help the participants to follow the teleconference. For example, this is especially useful when the teleconference is held in a foreign language or a participant has to leave the teleconference for a short time. Moreover, most teleconference services allow recording the information that is exchanged during the teleconference and especially its speech, either in audio form or in text form (generated by the transcription performed on-line/off-line). The record of the teleconference may then be used for later examination or distribution. For example, this allows browsing the record to pinpoint when a specific subject was discussed.

However, teleconferences may last for a relatively long time (up to some hours); as a result, the corresponding records become accordingly very long. Moreover, teleconferences may be attended by a relatively high number of participants providing different contributions; as a result, the records become accordingly very complex.

Therefore, teleconference services also allow creating minutes of each teleconference. The minute is created by shortening the transcription of the teleconference, so as to provide a more concise description of the teleconference giving a fast overview thereof.

For this purpose, automatic summarization techniques may be used. Particularly, the automatic summarization techniques allow extracting the most important pieces of information defining key features of the transcription. Alternatively, the automatic summarization techniques allow abstracting the transcription to create a semantic representation thereof. However, the automatic summarization techniques are quite complex.

Alternatively, the minute is created by simply reducing the transcription. For example, a fuzzy clustering model may be used to cluster sentences relating to corresponding categories. Artificial intelligence techniques may then be used to deduplicate the sentences of each cluster when their similarity exceeds a threshold. In this case as well, the performed operations are quite complex. Particularly, the clustering of the sentences involves a multi-objective optimization that is not an automatic task, but an iterative process requiring trial and failure to discover the clusters that efficiently groups the sentences (so that the sentences in each cluster are more similar one to another than to the sentences in the other clusters).

Duplicate contents may also be detected according to extracted features (such as similar words or images) that are weighted according to certain measurement criterion. Moreover, a preview of the teleconference may be created by identifying key frames according to the amount of interaction among the persons attending the teleconference that occurred during the presentation of the frames. For each pair of consecutive frames, if their difference is below a certain percentage, then only one of them is selected as key frame (such as the one with more content). However, the obtained results can be not completely satisfactory.

SUMMARY

A simplified summary of the present invention is herein presented in order to provide a basic understanding thereof; however, the sole purpose of this summary is to introduce some concepts of the invention in a simplified form as a prelude to its following more detailed description, and it is not to be interpreted as an identification of its key elements nor as a delineation of its scope.

Aspects of an embodiment of the present invention disclose a method, computer program product, and computer system for creating the minute by removing non-relevant portions and then similar relevant portions from the record of a teleconference. The method comprises classifying portions of the record as relevant or non-relevant according to corresponding relevance indicators with respect to a topic of the teleconference. The non-relevant portions are removed from the record. Pairs of relevant portions are classified as similar or non-similar according to corresponding similarity indicators. One of the relevant portions of each similar pair of relevant portions is removed from the minute.

More specifically, one or more aspects of the present invention are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present invention, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

DETAILED DESCRIPTION

With reference in particular to FIG. 1A-FIG. 1D, the general principles are shown of the solution according to an embodiment of the present invention.

Figure 1A:
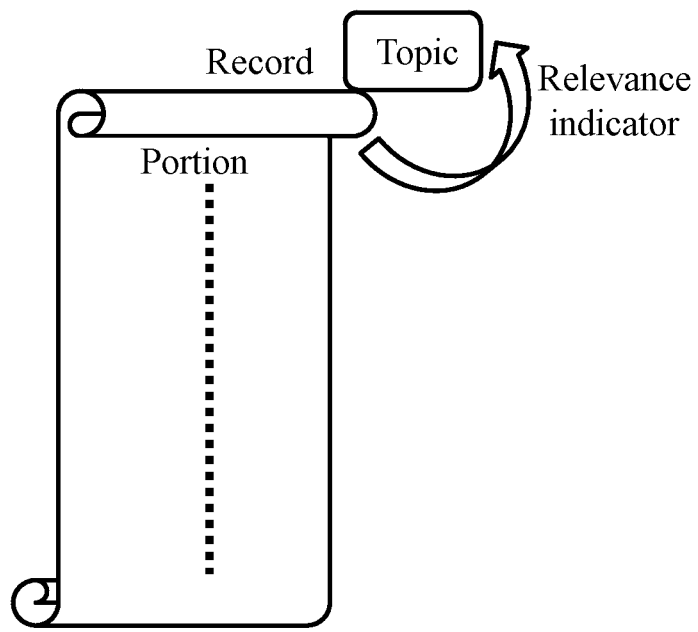
FIG. 1A-FIG. 1D show the general principles of the solution according to an embodiment of the present invention.

Starting from FIG. 1A, a teleconference (for example, a web conference over the Internet) takes place among a plurality of persons that participate in it (participants). The teleconference is used to exchange information in a synchronous way, so that the process is perceived by the participants as in real-time; for example, the teleconference implements a virtual meeting allowing the participants to confer about a specific topic (such as a project, an agreement, a litigation, an investment, a resolution, and so on). While the teleconference is in progress, a record thereof is taken. The record contains the information that has been exchanged during the teleconference; particularly, this includes a transcription in text form of the speech that has been uttered by the participants and possible multimedia contents that have been shared. An indication of the topic of the teleconference is also acquired (for example, from its invitation). A minute is then created from the record of the teleconference; the minute provides an overview of the (main) information exchanged in the teleconference in a shorter form (with respect to the record).

In an embodiment, the minute is created by reducing the record. For this purpose, corresponding relevance indicators are calculated of multiple portions of the record, for example, the portions include sentences and frames that are extracted from the record. Each relevance indicator measures a relevance of the corresponding portion with respect to the topic (i.e., how much the portion is connected to the topic that makes it useful considering the portion for understanding the topic). For example, the relevance indicator is calculated according to tags representative of the topic that are present in the portion. Each portion is classified as relevant or non-relevant (with respect to the topic) according to a comparison of the corresponding relevance indicator with a (relevance) threshold.

Figure 1B:
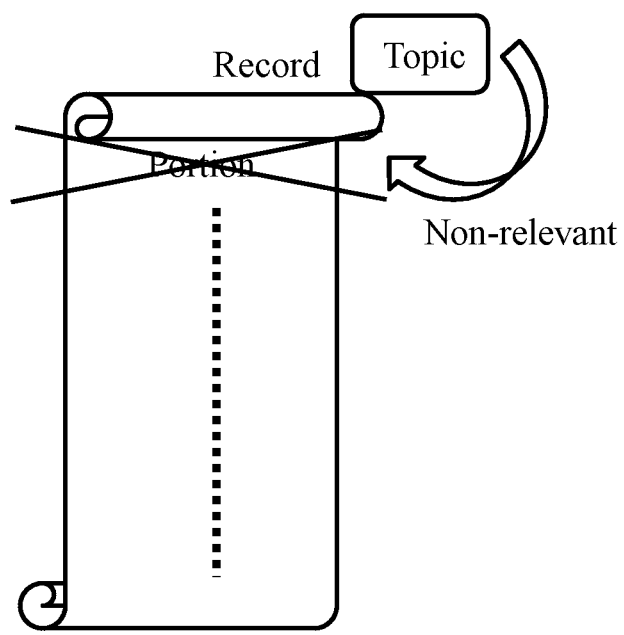

Moving to FIG. 1B, each portion that is non-relevant (for example, whose relevance indicator is lower than the relevance threshold) is removed from the minute.

Figure 1C:
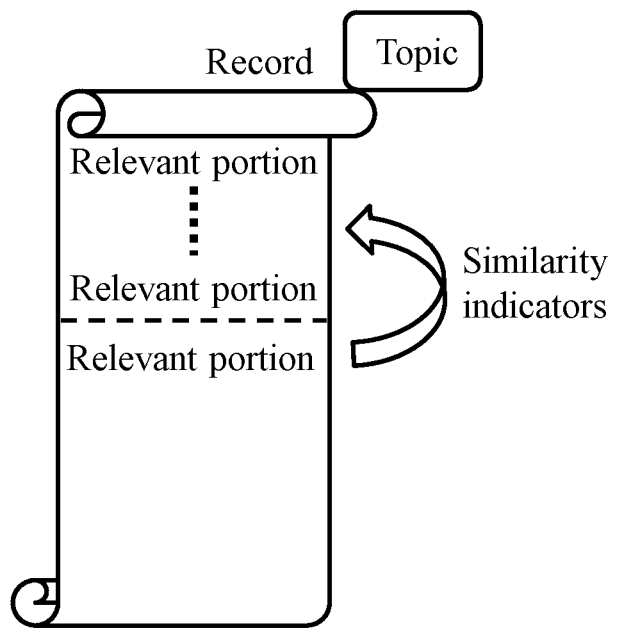

Moving to FIG. 1C, the portions that are relevant (for example, whose relevance indicator is higher than the relevance threshold) are further reduced by removing the ones that are redundant. For this purpose, corresponding similarity indicators are calculated of pairs of relevant portions (for example, for each current relevant portion with respect to preceding relevant portions along the record). Each similarity indicator measures a similarity between the relevant portions of the pair (i.e., how much their meanings overlap). For example, the similarity indicator is calculated according to a comparison between the tags of the topic that are present in the relevant portions. Each pair of relevant portions is classified as similar or non-similar according to a comparison of the corresponding similarity indicator with a (similarity) threshold.

Figure 1D:
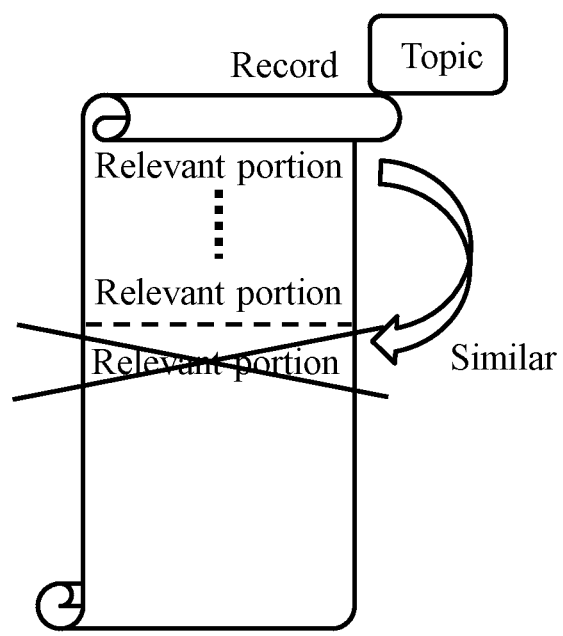

Moving to FIG. 1D, a (redundant) relevant portion is selected in each pair of relevant portions that are similar (for example, whose similarity indicator is higher than the similarity threshold). For example, the redundant relevant portion is set to one with the lower relevant indicator. Each redundant relevant portion is the removed from the minute.

The above-mentioned solution significantly facilitates the creation of the minute from the record of the teleconference. In fact, the relevant/non-relevant portions are determined with reference to an aspect being pre-defined by the topic, which simplifies their classification. Moreover, this also simplifies the comparison of the pairs of relevant portions for determining when they are similar/non-similar. Particularly, it is now possible to determine the similarity of the relevant portions by limiting to their aspects relating to the topic. As a result, the minute may be created with a reduced consumption of computational resources.

All of the above makes it possible to obtain a minute that is effective because the minute contains relevant portions of the record that are useful for understanding its topic. At the same time, the minute is concise because the minute is without non-relevant portions that may be disregarded for understanding its topic and without redundant relevant portions that are similar to other relevant portions conveying similar meanings. As a result, an inspection of the minute may be sufficient in most practical situations, without requiring access to the corresponding (full) record, which may accordingly reduce a network traffic for downloading the corresponding information.

Figure 2:
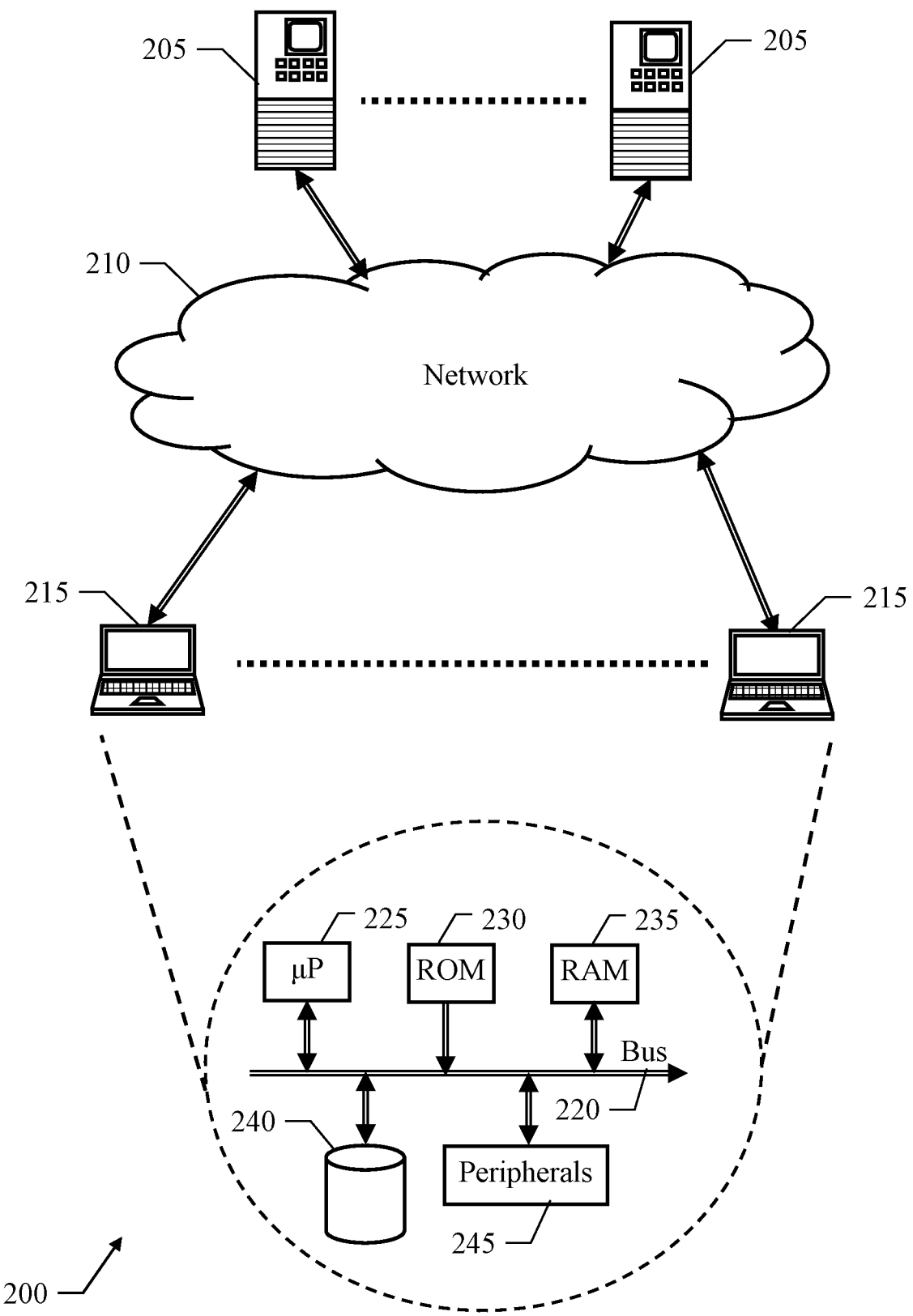
FIG. 2 shows a schematic block diagram of an information technology infrastructure that may be used to implement the solution according to an embodiment of the present invention.

With reference now to FIG. 2, a schematic block diagram is shown of an information technology infrastructure 200 that may be used to implement the solution according to an embodiment of the present invention.

The information technology infrastructure 200 has a distributed architecture, typically based on the Internet that is formed by millions of server computing systems, or simply servers 205, which are connected among them through a (telecommunication) network 210 of global type. Users of client computing systems, or simply clients 215 access the Internet in order to exploit services offered by the servers 205. Particularly, as far as relevant to the present invention, the servers 205 provide teleconference (and especially web conference) services supporting a number of teleconferences, each one allowing the users of multiple clients 215 to participate thereto.

Each of the above-mentioned computing systems (i.e., servers 205 and clients 215) comprises several units that are connected among them through a bus structure 220 at one or more levels (with an architecture that is suitably scaled according to the type of the computing system 205, 215). Particularly, a microprocessor (pP) 225, or more, provides a logic capability of the computing system 205, 215. A non-volatile memory (ROM) 230 stores basic code for a bootstrap of the computing system 205, 215 and a volatile memory (RAM) 235 is used as a working memory by the microprocessor 225. The computing system 205, 215 is provided with a mass-memory 240 for storing programs and data, for example, storage devices of a data center wherein each server 205 is implemented or a Solid-State Disk (SSD)

for each client 215. Moreover, the computing system 205, 215 comprises a number of controllers for peripherals, or Input/Output (I/O) units, 245. As far as relevant to the present invention, the peripherals 245 of each server 205 comprise a network adapter for plugging the server 205 into the corresponding data center and then connecting it to a console of the data center for its control (for example, a personal computer, also provided with a drive for reading/writing removable storage units, such as of USB type) and to a switch/router sub-system of the data center for its communication with the network 210, whereas the peripherals 245 of each client 215 comprise a keyboard, a mouse, a monitor, a network adapter for connecting to the network 210 and a drive for reading/writing removable storage units (such as of USB type).

Figure 3:
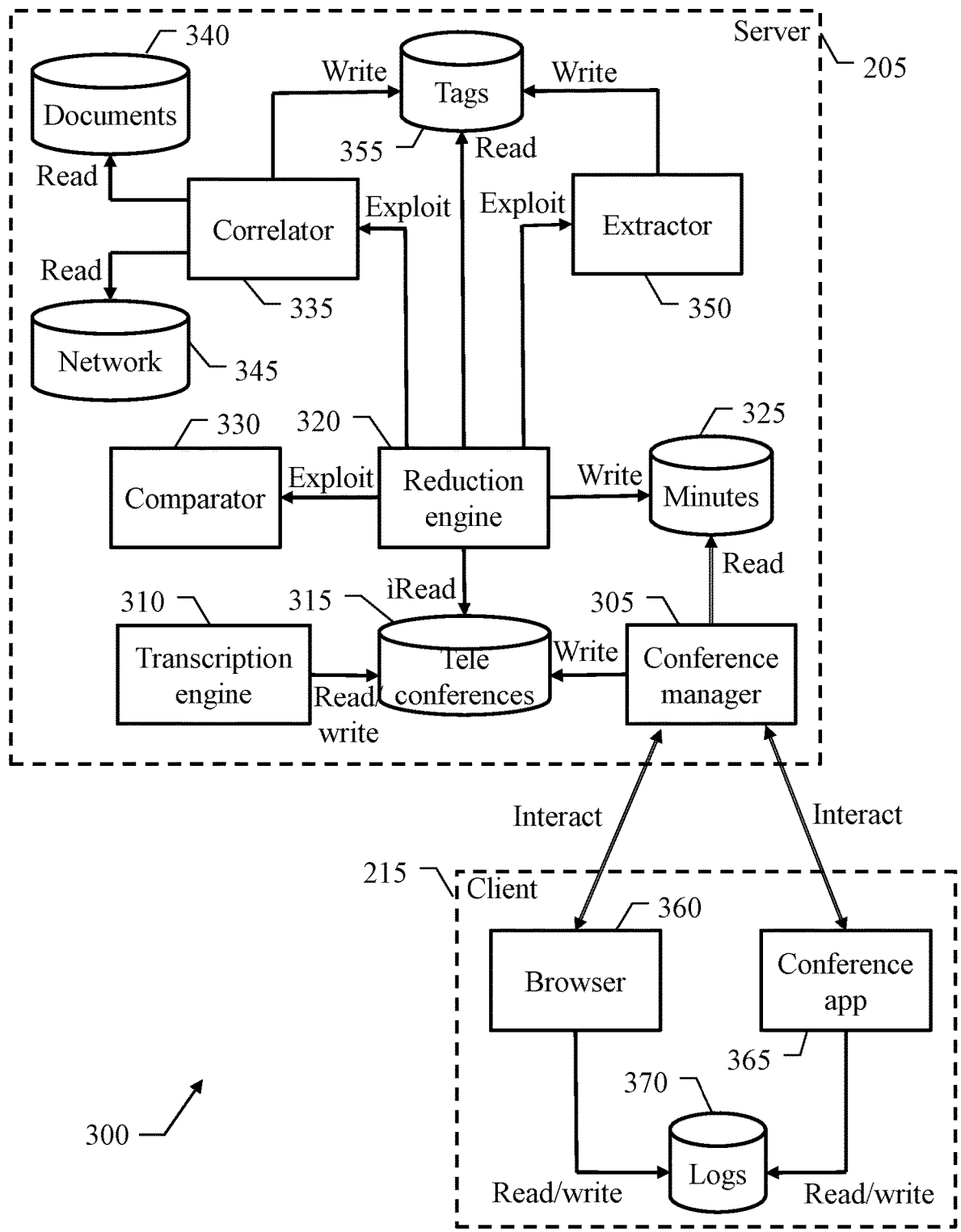
FIG. 3 shows the main software components that may be used to implement the solution according to an embodiment of the present invention.

With reference now to FIG. 3, the main software components are shown that may be used to implement the solution according to an embodiment of the present invention.

Particularly, all the software components (programs and data) are denoted as a whole with the reference 300. The software components are typically stored in the mass memory and loaded (at least partially) into the working memory of each computing system when the programs are running, together with an operating system and other application programs not directly relevant to the solution of the present invention (thus omitted in the figure for the sake of simplicity). The programs are initially installed into the mass memory, for example, from removable storage units or from the network. In this respect, each program may be a module, segment or portion of code, which comprises one or more executable instructions for implementing the specified logical function.

Starting from each server 205 (only one shown in the figure), it comprises the following components.

A conference manager 305 manages the teleconferences that are implemented by the server 205. Particularly, for each teleconference the conference manager 305 forwards the information that is received from each participant to the other participants of the teleconference. Moreover, as far as relevant to the present invention, the conference manager 305 records the teleconferences while they are in progress. Particularly, the conference manager 305 records the information that has been exchanged up to now in each teleconference (together with an indication of corresponding participant and time-stamp for each piece thereof). For example, the information comprises the speech that has been uttered (in audio form), multimedia contents that have been shared, a text chat that has been used for live questions and answers, and so on. A transcription engine 310 transcribes the speech of the teleconferences into text form (by applying speech recognition techniques). Both the conference manager 305 and the transcription engine 310 read/write a teleconferences repository 315. The teleconferences repository 315 has an entry for each teleconference (either in progress or completed). The entry contains operative information relating to the teleconference. The operative information comprises corresponding identifiers of its participants (with one of them flagged as a controller of the teleconference) and its topic. The operative information may also contain a series of (relevance/similarity/tag) thresholds to be used to create its minute (as described in detail in the following). Moreover, the entry contains a record of the teleconference, and the record stores the information that has been exchanged (speech, multimedia contents, text chat, and so on) and the transcription in text form of its speech.

In the solution according to an embodiment of the present invention, a reduction engine 320 creates minutes of the teleconferences by reducing their records. The reduction engine 320 reads the teleconferences repository 315 and writes a minutes repository 325, which is also read by the conference manager 305. The minutes repository 325 contains the minute(s) of each teleconference (either in progress or completed). The reduction engine 320 exploits a comparator 330. The comparator 330 compares pairs of images to determine their similarity indicators. The reduction engine 320 exploits a correlator 335. The correlator 335 determines tags representative of the topics with corresponding weights measuring their capacity to represent the topics. The correlator 335 reads a reference documents repository 340. The reference documents repository 340 contains one or more reference documents. For example, the reference documents are articles, books, web pages, and so on relating to known topics. The reference documents are used by the correlator 335 to analyze each topic for determining main tags thereof (with their weights) that are directly representative of the topic (for example, by applying cognitive techniques). The correlator 335 reads a relationship network repository 345. The relationship network repository 345 contains a (relationship) network of relationships among known tags. For example, the relationships are defined by concepts/specifications, general/particular terms, synonyms, and so on. The relationship network is used by the correlator 335 to determine secondary tags of each topic (with their weights) that are linked to its main tags, and then are indirectly representative of the topic. The reduction engine 320 exploits an extractor 350. The extractor 350 extracts the tags of the topic of each teleconference that are present in each portion of the teleconference. Both the correlator 335 and the extractor 350 write a tags repository 355, which is read by the reduction engine 320. The tags repository 355 has an entry for each teleconference. The entry stores the main/secondary tags of the topic of the teleconference together with their weights and stores the tags of each (relevant) portion of the record being currently present in the minute of the teleconference and its relevance indicator.

Moving to each client 215 (only one shown in the figure), it comprises the following components.

A (web) browser 360 is used to navigate (or surf) the Internet. Particularly, as far as relevant to the present invention, the browser 360 is used to participate to teleconferences implemented by the servers 205. In addition of or in alternative, a conference app 365 is dedicated to performing the same operations. Both the browser 360 and the conference app 365 interact with the conference manager 305 of each server 205. Moreover, both the browser 360 and the conference app 365 read/write a logs repository 370. The logs repository 370 contains a local copy of information relating to the teleconferences whose participants comprise the user of the client 125. The logs repository 370 has an entry for each teleconference (either in progress or completed). The entry contains the identifiers of the participants, the topic, the record, and the minute of the teleconference.

Figure 4A:
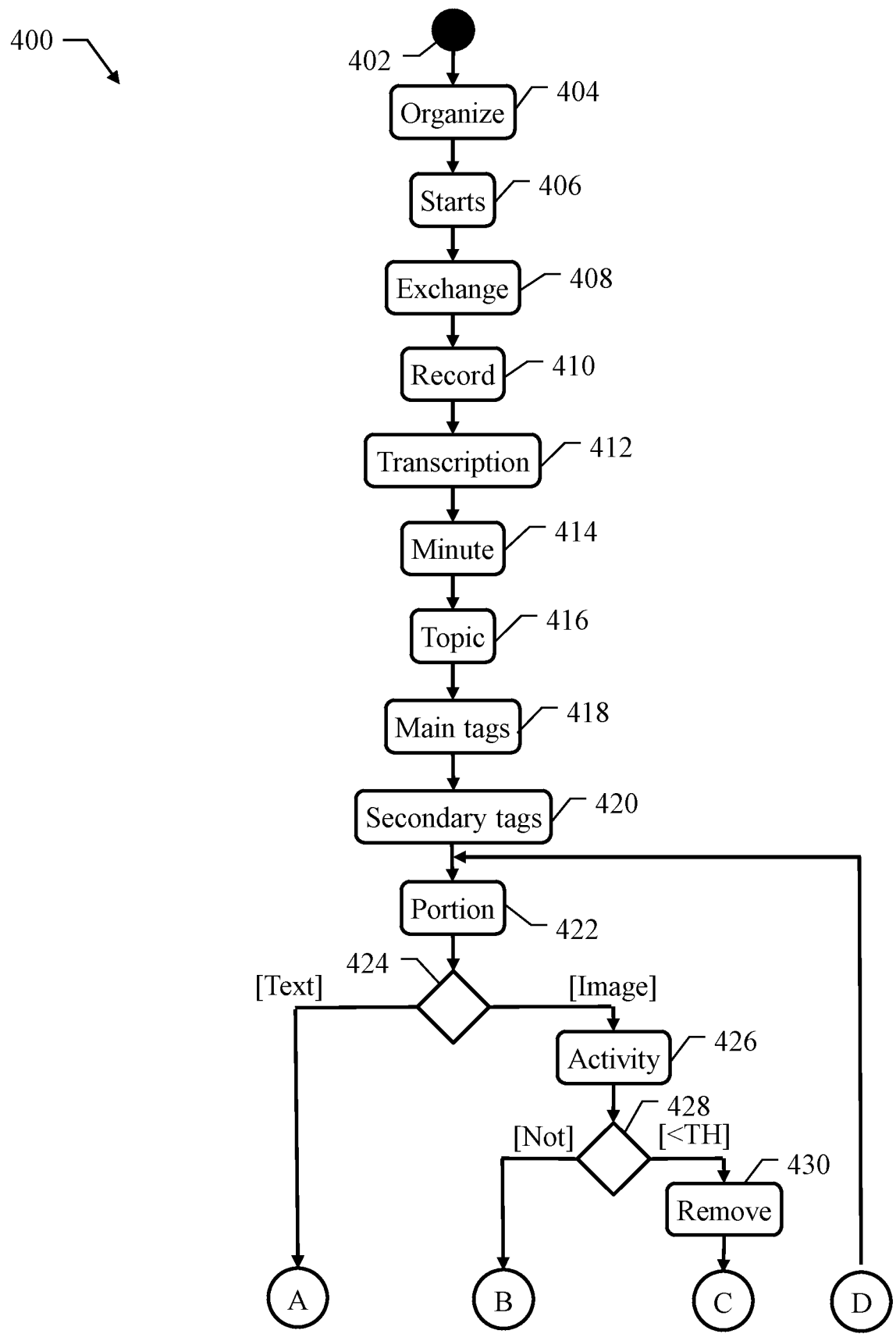
FIG. 4A-FIG. 4C show an activity diagram describing the flow of activities relating to an implementation of the solution according to an embodiment of the present invention.
Figure 4B:
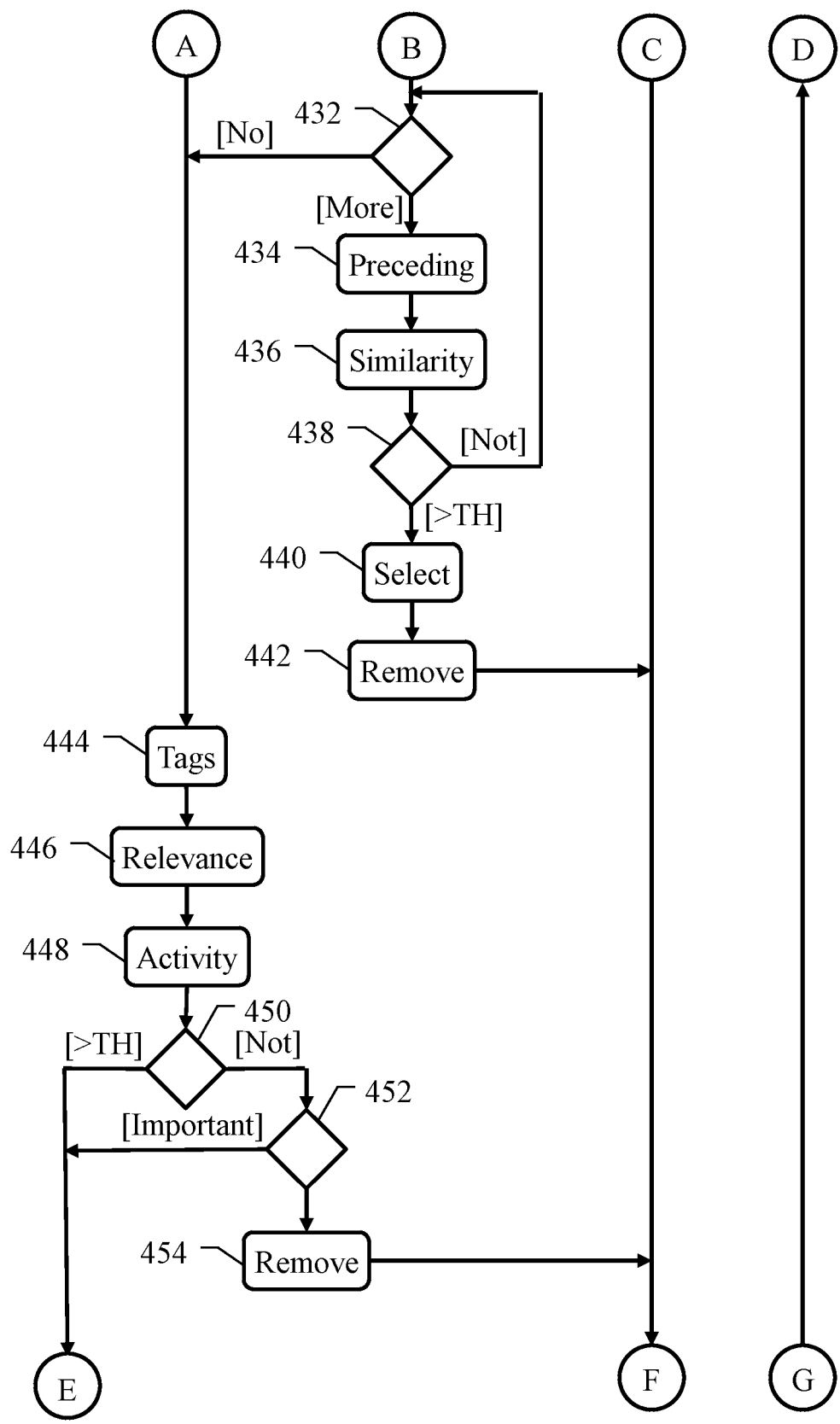
Figure 4C:
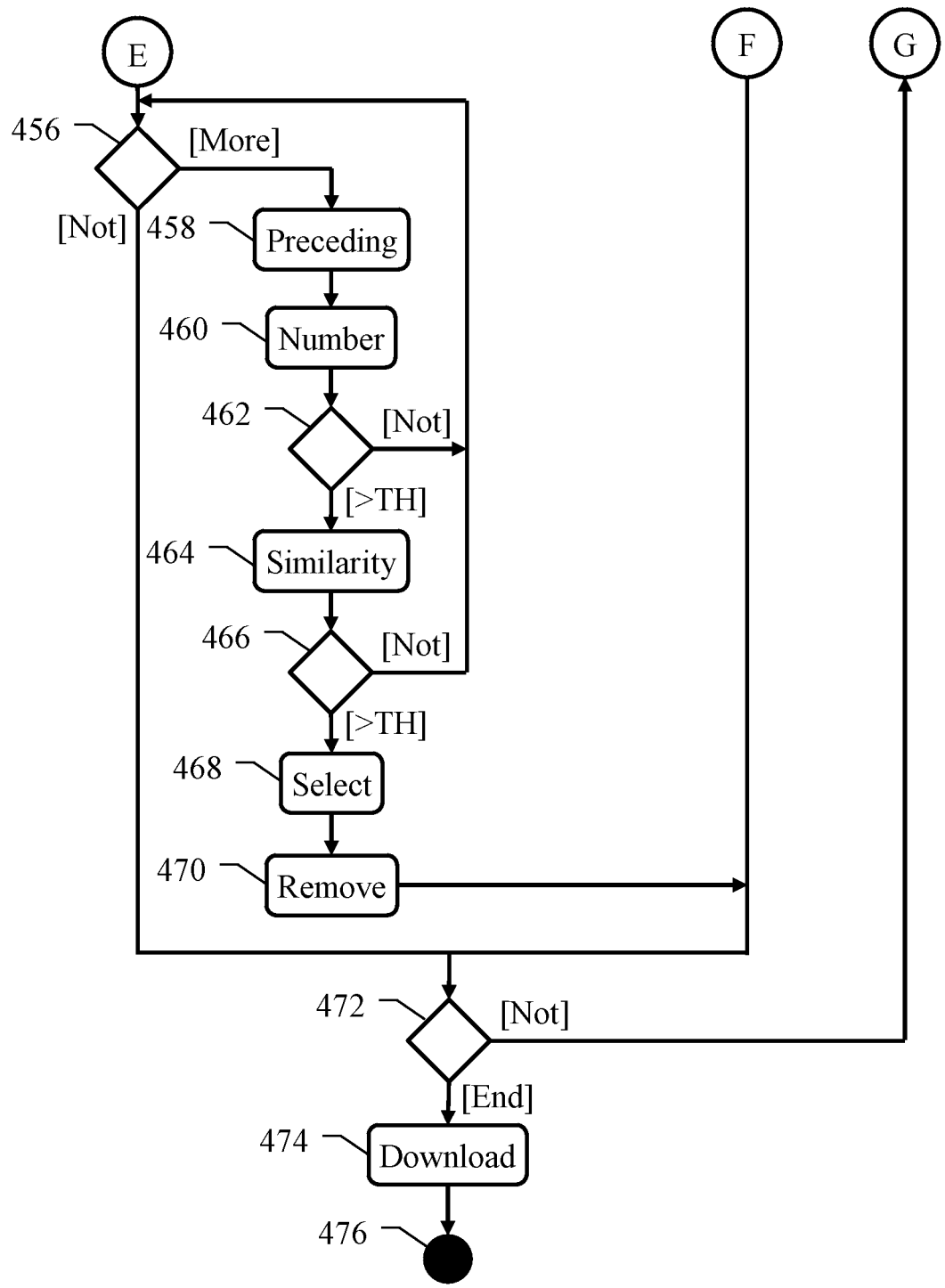

With reference now to FIG. 4A-FIG. 4C, an activity diagram is shown describing the flow of activities relating to an implementation of the solution according to an embodiment of the present invention.

Particularly, the diagram represents an exemplary process that may be used to create a minute of a teleconference with method 400. In this respect, each block may correspond to one or more executable instructions for implementing the specified logical function on the relevant server.

The process begins when a (new) teleconference is organized by its controller (via the browser or the conference app of the corresponding client, not shown in the figure). For example, the controller may create a virtual room for the teleconference, possibly schedule it for a certain time, enter its topic, select the other participants, and send an invitation thereto. The controller may also enter desired values of the (relevant/similarity/tag) thresholds, being set to default values otherwise. In this way, the controller may modulate a completeness of the minute at will. In response to a corresponding request received from the client of the controller, the process passes from start block 402 to block 404. At this point, the conference manager adds a (new) entry to the teleconferences repository with the relevant information of the teleconference. Immediately or at the time scheduled for it, the controller starts the teleconference (via the browser or the conference app). If not already done before, the controller is also prompted to enter the topic of the teleconference.

In response to a corresponding request received from the client of the controller, the conference manager at block 406 saves the topic into the teleconferences repository (if necessary) and then allows the other participants to enter the teleconference (via the browser or the conference app of the corresponding clients, not shown in the figure). The conference manager at block 408 receives the information provided by the client of each participant and forwards it to the clients of the other participants for its output thereon. Particularly, this comprises the (live) speech and video of each participant and may comprise a file that is submitted, a screen/window that is shared, a whiteboard that is used to collaborate by the participants, and so on. At the same time, the conference manager at block 410 starts saving the record of the teleconference (i.e., the information being exchanged) into the teleconferences repository. The above-described operations are repeated continually until the controller ends the teleconference (via the browser or the conference app), with the conference manager that stops performing them in response to a corresponding request received from the client of the controller.

The conference manager at block 412 commands the transcription engine to transcribe the speech of the teleconference into text form and save it into the teleconferences repository as well. This operation may be performed either while the teleconference is in progress of after it has been completed (for example, in response to a corresponding command received from the client of the controller or automatically). The conference manager at block 414 also commands the reduction engine to start creating the minute of the teleconference. This operation as well may be performed either while the teleconference is in progress of after it has been completed, once the corresponding speech of the teleconference has been transcribed (for example, in response to a corresponding command received from the client of the controller or automatically). For this purpose, the reduction engine adds a (new) empty entry to the minutes repository.

The reduction engine at block 416 retrieves the topic of the teleconference from the corresponding repository. The reduction engine at block 418 commands the correlator to determine the (topic) tags of the topic with their weights. For this purpose, the correlator at first determines the main topic tags. For example, the correlator determines the main topic tags as keywords expressing an essence of the reference documents relating to the topic and their weights as measuring an average reliability of the association of the topic with these reference documents. This operation does not adversely affect performance, since it is executed only once at the beginning of the teleconference. The correlator adds the main topic tags with their weights so obtained to the corresponding repository. The correlator at block 420 then determines the secondary topic tags. Particularly, starting from each main topic tag, the correlator moves throughout the relationship network up to a pre-defined depth defined by a hop number from the main topic tag (for example, 1-3). For each (secondary topic) tag that is encountered, the correlator calculates the corresponding weight as a ratio between the weight of the main topic tag and a reduction factor depending on the hop number (for example, with the reduction factor increasing in geometric series with coefficient 1.5, i.e., 1.5, 3.0, 6.0 and so on). The correlator adds the secondary topic tag with its weight to the corresponding repository (if not already present) or replaces its weight (if higher than the one already present).

The reduction engine at block 422 takes a (new) portion of the record into account. For example, the portion is defined by an isolate piece of text into which the speech has been transcribed (such as a speech section of a participant, a sentence, and so on) or a still image (such as a shared file, a frame extracted from a video at a certain rate, like every 1-3 s, and so on). The flow of activity branches at block 424 according to a type of the portion. If the portion is a (still) image, the blocks 426-442 are executed, whereas if the portion is a (piece of) text, the blocks 444-470 are executed. In both cases, the flow of activity merges again at block 472.

With reference now to block 426 (image), the reduction engine verifies an activity indicator of the teleconference (retrieved from a corresponding variable, set as described in the following). The activity indicator provides an indication of how much a current activity of the teleconference actually relates to its topic (with the higher the activity indicator the higher the connection to the topic). The flow of activity branches at block 428 according to a comparison of the activity indicator with an (activity) threshold, for example, 0.4-0.6 for the activity indicator ranging from 0 to 1. If the activity indicator is (possibly strictly) lower than the activity threshold, it means that the teleconference is currently not relating to its topic. For example, this happens when the participants take a pause and talk about something else, when the discussion digresses to another topic, and so on. In this case, the reduction engine at block 430 removes the image from the minute, by disregarding it without copying to the corresponding repository. This avoids processing images uselessly, with a corresponding saving of computational resources. The process then descends into block 472.

Referring back to block 428, if the activity indicator is (possibly strictly) higher than the activity threshold, it means that the teleconference is currently focusing on its topic. In this case, a loop is performed for comparing the (current) image with any (preceding) images of relevant portions that are already present in the minute (in the corresponding repository). The loop begins at block 432, wherein the reduction engine verifies whether any preceding images remain to be processed. If so, the reduction engine at block 434 takes a preceding image still to be processed into account (starting from a first one along the minute). The reduction engine at block 436 commands the comparator to calculate a (further) similarity indicator between the current image and the preceding image based on a comparison between their contents. For example, the similarity indicator is defined by the Sørensen-Dice coefficient of the pixel values of the current image and the preceding image (ranging from 0 to 1 for increasing degree of similarity). The flow of activity branches at block 438 according to a comparison of the similarity indicator with a (further similarity) threshold, for example, 0.8-0.9. If the similarity indicator is (possibly strictly) higher than the similarity threshold, the pair of the current image and the preceding image is classified as similar. In this case, the reduction engine at block 440 selects one between the current image and the preceding image as a redundant image of the pair to be removed from the minute. For example, the redundant image is determined by applying edge detection analysis (such as the one having the lower number of edges, the higher number of edges contained in the edges of the other image, and so on). The reduction engine at block 442 removes the redundant image from the minute. Particularly, in case of the current image, the reduction engine disregards it without copying to the minute repository. Conversely, in case of the preceding image, the reduction engine removes it from the minute repository and then adds the current image to the minute repository. The process now descends into block 472. In this way, the relevance and the similarity of the current image are determined at the same time from a simple comparison of the current image with the preceding images, with a corresponding saving of computational resources. With reference again to block 438, if the similarity indicator is (possibly strictly) lower than the similarity threshold, the process returns to block 432. Referring back to block 432, as soon as no preceding image remains to be processed (always true when no relevant portion being an image is present in the minute), the above-described loop is exited by passing to block 444 (which point is also reached directly from block 424 when the portion is a text).

With reference now to block 444 (text or image not similar to the image of any preceding relevant portion), the reduction engine commands the extractor to extract (portion) tags from the portion by searching the topic tags (retrieved from the corresponding repository) in the portion. The fact that only the topic tags are searched significantly simplifies the operation, with a corresponding saving of computational resources. Particularly, in case of a text, the extractor simply sets the portion tags to the topic tags that are found within the text. Instead, in case of an image, the extractor sets the portion tags to the topic tags that are deemed descriptive of the image (for example, by applying image recognition and cognitive techniques). In view of the above, the corresponding analysis of the image is performed only seldom (when the image is not similar to the image of any preceding relevant portion), with a corresponding saving of computational resources. The extractor saves the portion tags so determined into the corresponding repository. The reduction engine at block 446 calculates a relevance indicator of the portion with respect to the topic. For example, the relevance indicator is given by a sum of the weights of the portion tags divided by a sum of the weights of the topic tags (ranging from 0 to 1 for increasing relevance). The reduction engine at block 448 updates the activity indicator accordingly (in the corresponding variable). For example, the activity indicator is set to a running average of the relevance indicators over a current period (for example, in the last 10-15 s). In this way, the activity indicator increases/decreases as the corresponding last portions that have been processed are more/less relevant with respect to the topic.

The flow of activity branches at block 450 according to a comparison of the relevance indicator with a (relevance) threshold, for example, 0.8-0.9. If the relevance indicator is (possibly strictly) lower than the relevance threshold, the reduction engine at block 452 verifies the portion against one or more (important) categories of information that might be important in any situations, regardless of their connection to the topic (for example, for dates, addresses, links to web sites and so on). If the portion does not contain information belonging to any of the important categories, the portion is classified as non-relevant and the reduction engine at block 454 removes the portion from the minute, by disregarding it without copying to the corresponding repository. The process then descends into block 472. Referring back to block 452, if the portion contains information belonging to one or more important categories, the process continues to block 456. The same point is also reached directly from block 450 if the relevance indicator is (possibly strictly) higher than the relevance threshold. In both cases, the portion is classified as relevant, which avoids losing information that is correlated to the topic or that may be of interest (even if not strictly correlated to the topic of the teleconference).

A loop is now performed for comparing the (current) relevant portion with any (preceding) relevant portions that are present in the minute (in the corresponding repository). The loop begins with the reduction engine that verifies whether any preceding relevant portions remain to be processed. If so, the reduction engine at block 458 takes a preceding relevant portion still to be processed into account (starting from a first one along the minute). The reduction engine at block 460 compares the number of portion tags of the current relevant portion with the number of portion tags of the preceding relevant portion (retrieved from the corresponding repository).

The flow of activity branches at block 462 according to a comparison of a (tag) difference between the two numbers of portion tags with a (tag) threshold (for example, 5-10% of the number of topic tags, such as 1-3). If the tag difference is (possibly strictly) lower than the tag threshold, the pair of the current relevant portion and the preceding relevant portion is classified as non-similar immediately, without further analyzing their topic tags with a corresponding saving of computational resources. In this case, the process returns to block 456 directly. Conversely, if the tag difference is (possibly strictly) higher than the tag threshold, the reduction engine at block 464 calculates a similarity indicator between the current relevant portion and the preceding relevant portion based on the weights of their portion tags. For example, the similarity indicator is given by a difference between a sum of the weights of the portion tags of the current relevant portion and a sum of the weights of the portion tags of the preceding relevant portion (retrieved from the corresponding repository).

The flow of activity branches at block 466 according to a comparison of the similarity indicator with a (similarity) threshold, for example, 0.8-0.9. If the similarity indicator is (possibly strictly) higher than the similarity threshold, the pair of the current relevant portion and the preceding relevant portion is classified as similar. In this case, the reduction engine at block 468 selects one between the current relevant portion and the preceding relevant portion as a redundant relevant portion of the pair to be removed from the minute. For example, the redundant relevant portion is determined as the one having the lower relevance indicator, just calculated for the current relevant portion and retrieved from the tags repository for the preceding relevant portion (and then the one being the less relevant with respect to the topic). The reduction engine at block 470 removes the redundant relevant portion from the minute. Particularly, in case of the current relevant portion, the reduction engine disregards it without copying to the minute repository. Conversely, in the case of the preceding relevant portion, the reduction engine removes it from the minute repository and then adds the current relevant portion to the minute repository (at the same time saving its portion tags and relevance indicator into the tags repository). The process then descends into block 472. With reference again to block 466, if the similarity indicator is (possibly strictly) lower than the similarity threshold, the pair of the current relevant portion and the preceding relevant portion is classified as non-similar. In this case as well, the process returns to block 456. Referring back to block 456, as soon as no preceding relevant portion remains to be processed (always true when no relevant portion is present in the minute), the above-described loop is exited by descending into block 472.

With reference now to block 472, the reduction engine verifies whether any portions are still to be processed (always true while the teleconference is in progress). If so, the process returns to block 422 to repeat the same operations continually. Conversely, once the teleconference has ended (in response to a corresponding request received from the client of the controller) and the whole record has been processed, the above-described loop is exited by descending into block 474. At this point, the conference manager downloads the minute to the clients of one or more participants. For example, this happens individually for each of the clients in response to a corresponding request received from the client of the participant (submitted via the browser or the app), automatically for each participant according to a configuration parameter set by the participant, or for all the participants according to a configuration parameter set by the controller. In any case, the conference manager retrieves the minute from the corresponding repository and transmits it to the required clients, either as a whole after the teleconference has been completed or in streaming while it is in progress. The browser or the conference app of each client receiving the minute outputs it (for example, by displaying the minute in a dedicated windows) for its reading by the corresponding participant. The method then ends at the end block 476.

Naturally, in order to satisfy local and specific requirements, a person skilled in the art may apply many logical and/or physical modifications and alterations to the present invention. More specifically, although this invention has been described with a certain degree of particularity with reference to one or more embodiments thereof, it should be understood that various omissions, substitutions and changes in the form and details as well as other embodiments are possible. Particularly, different embodiments of the present invention may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present invention may be incorporated in any other embodiment as a matter of general design choice. Moreover, items presented in a same group and different embodiments, examples or alternatives are not to be construed as defacto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for creating a minute of a teleconference. However, the teleconference may be of any type (for example, implementing a virtual meeting, seminar, presentation, lecture, workshop, classroom, course, tutorial, and so on over any global, local, wide area network, exploiting any type of wired and/or wireless connections, such as of metal wire, optical fiber, Wi-fi, mobile telephone, satellite type and so on). Moreover, the minute may be created at any time (for example, while the teleconference is in progress, after it has been completed, automatically, upon request of its controller, and/or any other participant and so on) and in any way (for example, adding portions to the minute initially empty, removing portions from the minute initially full as set to the whole record or a part thereof, and so on).

In an embodiment, the minute is created from a record of the teleconference. However, the record may be of any type (for example, containing speech in audio form, speech transcribed into text form, images, drawings, videos, any combination thereof, and so on) and it may be provided in any way (for example, acquired incrementally, loaded completely, locally/remotely, and so on).

In an embodiment, the method comprises the following steps under the control of a computing system. However, the computing system may be of any type (see below).

In an embodiment, the method comprises acquiring (by the computing system) an indication of a topic of the teleconference. However, the topic may be of any type (for example, partial, different, and additional topics with respect to the ones mentioned above) and it may be acquired in any way (for example, retrieved from its invitation, typed at its start, extracted from a calendar item, and so on).

In an embodiment, the method comprises calculating (by the computing system) corresponding relevance indicators of a plurality of portions of the record. However, the relevance indicators may be calculated for any number of portions (for example, all the ones composing the record, part of them, such as only for one or more categories thereof, such as text with or without images, and so on). Moreover, the portions may be of any type (for example, speech sections, sentences, paragraphs, images, drawings, videos, and so on).

In an embodiment, each relevance indicator is indicative of a relevance of the corresponding portion with respect to the topic. However, each relevance indicator may be calculated in any way (for example, according to tags of the topic, the whole content of the topic, and so on).

In an embodiment, the method comprises classifying (by the computing system) each of the portions as relevant or non-relevant according to a comparison of the corresponding relevance indicator with a relevance threshold. However, the relevance threshold may have any value and the portions may be classified accordingly in any way (for example, as relevant when their relevance indicators are higher or equal, strictly higher, lower or equal, strictly lower, and so on with respect to the relevance threshold).

In an embodiment, the method comprises removing (by the computing system) each non-relevant portion from the minute. However, the non-relevant portion may be removed in any way (for example, by not adding it to the minute when initially empty, by deleting it from the minute when initially full, and so on).

In an embodiment, the method comprises calculating (by the computing system) corresponding similarity indicators of one or more pairs of the relevant portions. However, the similarity indicators may be calculated for any number of pairs of relevant portions (for example, formed by each relevant portion with its preceding relevant portions, by all the possible combinations of the relevant portions, and so on).

In an embodiment, each similarity indicator is indicative of a similarity between the corresponding relevant portions. However, each similarity indicator may be calculated in any way (for example, according to tags of the topic being present in the relevant portions, to a comparison between the contents of relevant portions, and so on).

In an embodiment, the method comprises classifying (by the computing system) each of the pairs of relevant portions as similar or non-similar according to a comparison of the corresponding similarity indicator with a similarity threshold. However, the similarity threshold may have any value and the pairs of relevant portions may be classified accordingly in any way (for example, as similar when their similarity indicators are higher or equal, strictly higher, lower or equal, strictly lower, and so on with respect to the similarity threshold).

In an embodiment, the method comprises removing (by the computing system) a redundant one of the relevant portions of each similar pair of relevant portions from the minute. However, the redundant relevant portion may be selected in any way between the relevant portions of the similar pair (for example, according to their relevance indicators, informative content, position in the record, any combination thereof, and so on). Moreover, the redundant relevant portion may be removed in any way (for example, by not adding it to the minute when initially empty, by deleting it from the minute when initially full, and so on).

Further embodiments provide additional advantageous features, which may however be omitted at all in a basic implementation.

In an embodiment, the method comprises selecting (by the computing system) the redundant portion of each of the similar pairs of relevant portions according to the corresponding relevance indicators. However, the redundant relevant portion may be selected in any way according to the relevance indicators (for example, by simply considering the higher value, by weighting the relevance indicators according to the positions of the relevant portions in the record, such as giving priority to relevant portions at the beginning/end with respect to relevant portions in the middle of the record, and so on).

In an embodiment, the method comprises, for each current one of the relevant portions, calculating (by the computing system) the corresponding similarity indicators of the pairs formed by the current relevant portion and one or more preceding relevant portions of the relevant portions preceding the current relevant portion along the record. However, the preceding relevant portions may be in any number.

In an embodiment, the method comprises acquiring (by the computing system) each current one of the portions. However, each current portion may be acquired in any way (for example, locally or remotely, as is or transcribed, and so on).

In an embodiment, the method comprises creating (by the computing system) the minute incrementally in real-time in response to said acquiring each current portion by discarding the current portion to be removed from the minute or adding the current portion to the minute otherwise. However, the minute may be created in real-time in any (for example, making it available while it is created, later on after its completion, and so on).

In an embodiment, the method comprises determining (by the computing system) one or more topic tags being representative of the topic. However, the topic tags may be in any number and determined in any way (for example, with cognitive, bag of words, machine learning, and so on techniques).

In an embodiment, the method comprises extracting (by the computing system) any portion tags of the topic tags being present in each of the portions. However, the portion tags may be extracted in any way (for example, by searching exact matchings, grammatical variations, synonyms, and so on).

In an embodiment, the method comprises calculating (by the computing system) the relevance indicator of each portion according to the portion tags of the portion. However, the relevance indicator may be calculated in any way according to the portion tags (for example, according to their weights, number, occurrences, any other linear/non-linear relationship, and so on).

In an embodiment, the method comprises calculating (by the computing system) the similarity indicator of each of the pairs of relevant portions according to the corresponding portion tags. However, the similarity indicator may be calculated in any way according to the portion tags (for example, according to the difference/ratio of their number, their weights, the number/weights of their common portion tags, any other linear/non-linear relationship, and so on).

In an embodiment, the method comprises determining (by the computing system) the topic tags with corresponding weights measuring a capacity thereof to represent the topic. However, the weights may have any value (for example, continuous in a certain range, discrete at two or more be pre-determined levels, and so on) and they may be determined in any way (for example, directly for main topic tags and indirectly for secondary topic tags derived therefrom, directly for all the topic tags, and so on).

In an embodiment, the method comprises calculating (by the computing system) the relevance indicator of each of the portions according to the weights of the portion tags of the portion. However, the relevance indicator may be calculated in any way according to the weights of the portion tags (for example, according to the sum/product of the weights of the portion tags, the sum/product of the weights of the portion tags multiplied by their occurrences, any linear/non-linear function of the weights, and so on).

In an embodiment, the method comprises calculating (by the computing system) the similarity indicator of each of the pairs of relevant portions according to the weights of the corresponding portion tags. However, the similarity indicator may be calculated in any way according to the weights of the portion tags (for example, according to the difference/ratio of the sum/product of the weights of the portion tags, of the sum/product of the weights of the portion tags multiplied by the corresponding occurrences, of any linear/non-linear function of the weights, and so on).

In an embodiment, the method comprises determining (by the computing system) one or more main topic tags of the topic tags according to an analysis of the topic. However, the main topic tags may be in any number and determined according to any analysis of the topic (for example, by exploiting any reference documents, any trained model, and so on).

In an embodiment, the method comprises determining (by the computing system) one or more secondary topic tags of the topic tags being linked to corresponding ones of the main topic tags. However, the secondary topic tags may be in any number and determined according to any links to the main topic tags (for example, by limiting the search to any pre-defined distance from the main topic tags in a relationship network, such as maximum number of hops, minimum cumulative correlation and the like, by determining them from a table, and so on).

In an embodiment, the method comprises setting (by the computing system) the weight of each of the secondary topic tags to the weight of the corresponding main topic tag being reduced according to a distance of the secondary topic tag from the main topic tag. However, the weights of the main topic tags may have any values (for example, different according to the corresponding capacity of representing the topic, all the same, and so on). Moreover, the weights of the secondary topic tags may be determined in any way from the ones of the main topic tags (for example, by reducing the weights of the main topic tags in any way, such as proportionally, geometrically, exponentially and the like, according to any distance therefrom, such as defined by hop number, correlation and the like, according to any other linear/non-linear relationship, and so on).

In an embodiment, the method comprises determining (by the computing system) a tag indicator of the pair of relevant portions according to a comparison between the numbers of the portion tags of the relevant portions thereof. However, the tag indicator may be determined in any way (for example, as the difference between the numbers of the portion tags, as the number of the common portion tags, and so on).

In an embodiment, the method comprises classifying (by the computing system) the pair of relevant portions as non-similar in response to the tag indicator reaching a tag threshold. However, the tag threshold may have any value and the pairs of relevant portions may be classified as non-similar accordingly in any way (for example, when the number/weights of different topic tags is (possibly strictly) lower that it, when the number/weights of common topic tags is (possibly strictly) higher that it, and so on); in any case, the possibility is not excluded of always calculating the similarity indicator directly.

In an embodiment, the method comprises receiving (by the computing system) a manual selection of the tag threshold. However, the tag threshold may be selected at any value (for example, continuously in a certain range, in a discrete manner among two or more be pre-determined levels, and so on) and in any way (for example, globally for the teleconference, individually for each participant, and so on).

In an embodiment, the method comprises, for each of the portions being a current image, calculating (by the computing system) corresponding further similarity indicators of one or more pairs of images comprising the current image and corresponding relevant portions being relevant images each according to a comparison between a representation of the current image and a representation of the relevant image thereof. However, the pair of images may be in any number and their further similarity indicators may be calculated in any way (for example, according to any similarity coefficient, such as Sprensen-Dice, Jaccard and so on, any edge analysis, and so on).

In an embodiment, the method comprises, classifying (by the computing system), in response to the further similarity indicator of one of the pairs of images reaching a further similarity threshold, the current image as relevant and the pair of images defining one of the pairs of relevant portions as similar. However, the further similarity threshold may have any value and the current image may be determined to be relevant/similar accordingly in any way (for example, when the similarity coefficient is (possibly strictly) higher that it, when the number of similar edges is (possibly strictly) higher that it, and so on); in any case, the possibility is not excluded of always calculating the similarity indicator directly.

In an embodiment, the method comprises selecting (by the computing system) the redundant portion of the pair of relevant portions defined by the pair of images according to an edge analysis thereof. However, the edge analysis may be of any type (for example, search-based, zero-crossing based, and so on) and it may be used in any way to select the redundant portion in any way (for example, according to the number/size of edges, the number/size of edges of an image contained in the edges of the other image, any combination thereof, and so on).

In an embodiment, the method comprises receiving (by the computing system) a manual selection of the relevance threshold. However, the relevance threshold may be selected at any value and in any way (for example, either the same or different with respect to above).

In an embodiment, the method comprises receiving (by the computing system) a manual selection of the similarity threshold. However, the similarity threshold may be selected at any value and in any way (for example, either the same or different with respect to above).

In an embodiment, the method comprises outputting (by the computing system) a representation of the minute. However, the minute may be output in any way (for example, displayed, printed, locally/remotely, and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the method of above when the computer program is executed on the computing system. An embodiment provides a computer program product that comprises one or more computer readable storage media having program instructions collectively stored in said one or more computer readable storage media, the program instructions readable by the computing system to cause the computing system to perform the same method. However, the program may be implemented as a stand-alone module, as a plug-in for a pre-existing program (for example, the conference manager, the browser or the conference app) or even directly in the latter; moreover, the program may take any form suitable to be used by any computing system (see below).

An embodiment provides a system comprising means that are configured for performing the steps of the above-described method. An embodiment provides a system comprising a circuitry (i.e., any hardware suitably configured, for example, by software) for performing each step of the same method. However, the system may be of any type (for example, a server offering a corresponding service, such as a physical machine, a virtual machine, a cluster and the like, a client of each participant, such as a personal computer, a tablet, a smartphone and the like, a combination thereof and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for creating a minute of a teleconference from a record thereof, wherein the method comprises:
    acquiring, by one or more processors, an indication of a topic of the teleconference,
    calculating, by the one or more processors, corresponding relevance indicators of a plurality of portions of the record each being indicative of a relevance of the corresponding portion with respect to the topic,
    classifying, the one or more processors, each of the plurality of portions as relevant or non-relevant according to a comparison of the corresponding relevance indicator with a relevance threshold,
    removing, by the one or more processors, each non-relevant portion from the minute leaving only relevant portions remaining in the minute,
    calculating, by the one or more processors, corresponding similarity indicators of one or more pairs of the relevant portions each being indicative of a similarity between the corresponding relevant portions of a pair,
    classifying, by the one or more processors, each of the one or more pairs of relevant portions as similar or non-similar according to a comparison of the corresponding similarity indicator with a similarity threshold,
    selecting, by the one or more processors, a redundant portion of each of the similar pairs of relevant portions to be a relevant portion of associated similar pair with a lower relevance indicator, and
    removing, by the one or more processors, the redundant one of the relevant portions of each similar pair of relevant portions from the minute.

2. The computer-implemented method of claim 1, further comprising, for each current relevant portion of the relevant portions:
    calculating, by the one or more processors, the corresponding similarity indicators of the pairs formed by the current relevant portion and one or more preceding relevant portions of the relevant portions preceding the current relevant portion along the record.

3. The computer-implemented method of claim 1, further comprising:
    acquiring, by the one or more processors, each current portion of the plurality of portions, and
    creating, by the one or more processors, the minute incrementally in real-time in response to said acquiring each current portion by discarding the current portion to be removed from the minute or adding the current portion to the minute otherwise based on how the current portion is classified.

4. The computer-implemented method of claim 1, further comprising:
    determining, by the one or more processors, one or more topic tags being representative of the topic,
    extracting, by the one or more processors, any portion tags present in each of the plurality of portions by searching for the topic tags,
    calculating, by the one or more processors, the relevance indicator of each portion according to the portion tags of the associated portion, and
    calculating, by the one or more processors, the similarity indicator of each of the one or more pairs of relevant portions according to the corresponding portion tags.

5. The computer-implemented method of claim 4, further comprising:
    determining, by the one or more processors, the topic tags with corresponding weights measuring a capacity thereof to represent the topic, wherein a weight is a measure of the topics tags capacity to represent the topic,
    calculating, by the one or more processors, the relevance indicator of each of the portions according to the weights of the portion tags of the portion, and
    calculating, by the one or more processors, the similarity indicator of each of the pairs of relevant portions according to the weights of the corresponding portion tags.

6. The computer-implemented method of claim 5, further comprising:
    determining, by the one or more processors, one or more main topic tags of the topic tags according to an analysis of the topic,
    determining, by the one or more processors, one or more secondary topic tags of the topic tags being linked to corresponding ones of the main topic tags, and
    setting, by the one or more processors, the weight of each of the secondary topic tags to the weight of the corresponding main topic tag being reduced according to a distance of the secondary topic tag from the main topic tag.

7. The computer-implemented method of claim 4, further comprising, for each of the one or more pairs of relevant portions:
    determining, by the one or more processors, a tag indicator of the pair of relevant portions according to a comparison between corresponding numbers of the portion tags of the relevant portions thereof, and
    classifying, by the one or more processors, the pair of relevant portions as non-similar in response to the tag indicator reaching a tag threshold.

8. The computer-implemented method of claim 7, further comprising:
    receiving, by the one or more processors, a manual selection of the tag threshold.

9. The computer-implemented method of claim 1, further comprising, for each of the plurality of portions being a current image:
    calculating, by the one or more processors, corresponding further similarity indicators of one or more pairs of images comprising the current image and corresponding relevant portions being relevant images each according to a comparison between a representation of the current image and a representation of the relevant image thereof, and
    classifying, by the one or more processors, in response to the further similarity indicator of one of the pairs of images reaching a further similarity threshold, the current image as relevant and the pair of images defining one of the pairs of relevant portions as similar.

10. The computer-implemented method of claim 9, further comprising:
    selecting, by the one or more processors, the redundant portion of the pair of relevant portions defined by the pair of images according to an edge analysis thereof.

11. The computer-implemented method of claim 9, further comprising:

receiving, by the one or more processors, a manual selection of at least one of the relevance threshold and the similarity threshold.

12. The computer-implemented method of claim 1, further comprising:

outputting, by the one or more processors, a representation of the minute.

13. A computer program product for creating a minute of a teleconference from a record thereof, the computer program product comprising one or more computer readable storage media having program instructions collectively stored in said one or more computer readable storage media, the program instructions readable by a computing system to cause the computing system to perform a method comprising:

acquiring an indication of a topic of the teleconference;

calculating corresponding relevance indicators of a plurality of portions of the record each being indicative of a relevance of the corresponding portion with respect to the topic;

classifying each of the portions as relevant or non-relevant according to a comparison of the corresponding relevance indicator with a relevance threshold;

removing each non-relevant portion from the minute leaving only relevant portions remaining in the minute;

calculating corresponding similarity indicators of one or more pairs of the relevant portions each being indicative of a similarity between the corresponding relevant portions of a pair;

classifying each of the one or more pairs of relevant portions as similar or non-similar according to a comparison of the corresponding similarity indicator with a similarity threshold;

selecting a redundant portion of each of the similar pairs of relevant portions to be a relevant portion of associated similar pair with a lower relevance indicator; and removing the redundant one of the relevant portions of each similar pair of relevant portions from the minute.

14. The computer program product of claim 13, the method further comprising, for each current relevant portion of the relevant portions:

calculating the corresponding similarity indicators of the pairs formed by the current relevant portion and one or more preceding relevant portions of the relevant portions preceding the current relevant portion along the record.

15. The computer program product of claim 13, the method further comprising:

acquiring each current portion of the plurality of portions; and creating the minute incrementally in real-time in response to said acquiring each current portion by discarding the current portion to be removed from the minute or adding the current portion to the minute otherwise based on how the current portion is classified.

16. A computer system for creating a minute of a teleconference from a record thereof, the computer system comprises:

one or more computer processors;

one or more computer readable storage media;

program instructions collectively stored on the one or more computer readable storage media for execution by at least one of the one or more computer processors, the program instructions readable by a computing system to cause the computing system to perform a method comprising:

acquiring an indication of a topic of the teleconference;

calculating corresponding relevance indicators of a plurality of portions of the record each being indicative of a relevance of the corresponding portion with respect to the topic;

classifying each of the one or more portions as relevant or non-relevant according to a comparison of the corresponding relevance indicator with a relevance threshold;

removing each non-relevant portion from the minute leaving only relevant portions remaining in the minute;

calculating corresponding similarity indicators of one or more pairs of the relevant portions each being indicative of a similarity between the corresponding relevant portions of a pair;

classifying each of the pairs of relevant portions as similar or non-similar according to a comparison of the corresponding similarity indicator with a similarity threshold;

selecting a redundant portion of each of the similar pairs of relevant portions to be a relevant portion of associated similar pair with a lower relevance indicator; and removing the redundant one of the relevant portions of each similar pair of relevant portions from the minute.

17. The computer system of claim 16, the method further comprising, for each current relevant portion of the relevant portions:

calculating the corresponding similarity indicators of the pairs formed by the current relevant portion and one or more preceding relevant portions of the relevant portions preceding the current relevant portion along the record.

* * * * *